United States Patent [19]

Zeilon

[11] Patent Number: 4,689,894
[45] Date of Patent: Sep. 1, 1987

[54] CLOSED INTERMITTENT DRYING PROCESS

[76] Inventor: Sten O. Zeilon, Heimdalsgatan 21, S-260 14 Glumslöv, Sweden

[21] Appl. No.: 800,620
[22] PCT Filed: Mar. 5, 1985
[86] PCT No.: PCT/SE85/00097
§ 371 Date: Oct. 23, 1985
§ 102(e) Date: Oct. 23, 1985
[87] PCT Pub. No.: WO85/04001
PCT Pub. Date: Sep. 12, 1985

[30] Foreign Application Priority Data

Mar. 6, 1984 [SE] Sweden .................. 8401221

[51] Int. Cl.$^4$ ................................. F26B 3/02
[52] U.S. Cl. ............................. 34/13; 34/26; 34/27; 34/35; 34/86
[58] Field of Search ............ 34/12, 13, 22, 26, 20, 34/27, 29, 30, 32, 35, 46, 73, 77, 86

[56] References Cited

U.S. PATENT DOCUMENTS

| | | | |
|---|---|---|---|
| 3,086,533 | 4/1963 | Touton | 34/30 |
| 3,939,573 | 2/1976 | Berti | 34/26 |
| 3,965,696 | 6/1976 | Thomason | 62/234 |
| 4,020,562 | 5/1977 | Wevermann | 34/26 |
| 4,255,870 | 3/1981 | Malmquist | 34/35 |

FOREIGN PATENT DOCUMENTS

| | | |
|---|---|---|
| 2218819 | 9/1974 | France . |
| 348824 | 9/1972 | Sweden . |
| 7702672-2 | 7/1982 | Sweden . |

Primary Examiner—Albert J. Makay
Assistant Examiner—David W. Westphal
Attorney, Agent, or Firm—Shapiro and Shapiro

[57] ABSTRACT

A closed intermittent process for drying a moist material, in which process gas is circulated internally for transporting vapour formation heat and water vapour out of the material, the water vapour being condensed from a cooled mixture of gas and water vapour, and for heating the material to be dried. The material is preferably stored in at least two essentially equally large lots (31, 32), each in one essentially gastight chamber (1, 2). Through one lot (31) there is conducted alternately a cooling/drying cycle and a heating cycle of equal duration, the former utilizing a first circulating gas flow (11) cooled by a cooling medium and the latter utilizing a second circulating gas flow (12) heated by a heating medium. Through the other lot (32), a third circulating gas flow (22) heated against a heating medium conducts a heating cycle concurrently with cooling/drying in the first lot (31), and a fourth circulating gas flow (21) cooled against a cooling medium conducts a cooling/drying cycle concurrently with the heating cycle in the first lot (31).

14 Claims, 8 Drawing Figures

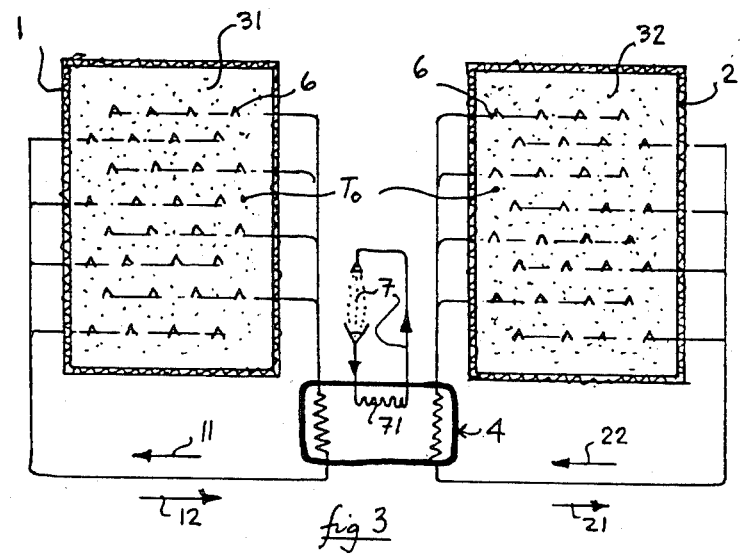
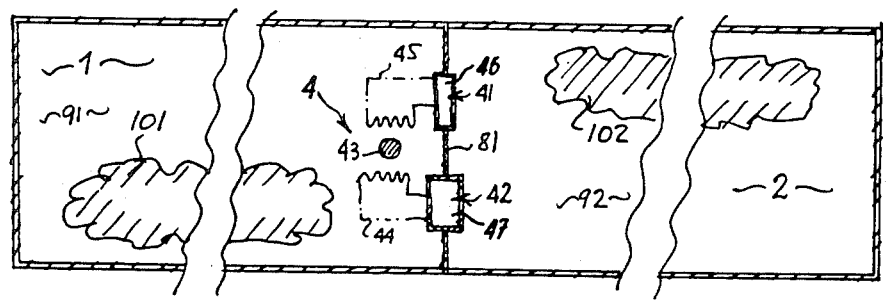
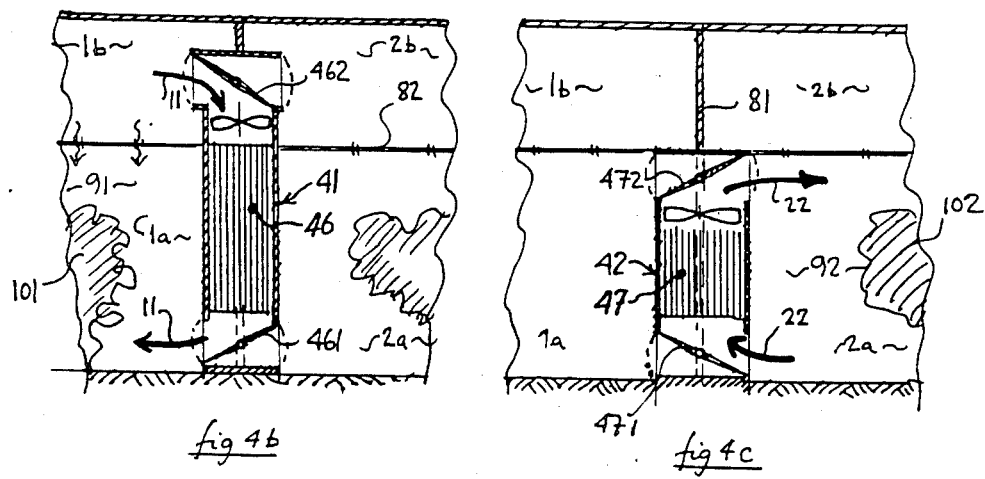

CLOSED INTERMITTENT DRYING PROCESS

The present invention relates to a closed intermittent process for drying moist material distributed to expose a large area to a gas flowing through the material and stacked in such a manner that a moderate gas flow resistance is obtained. The material to be dried may be, for example, grain, fibre crops, timber, granulates or liquid products which are spread on horizontal metal sheets.

The process utilizes, in a known manner, a circuit integrated with the drying process and having a cooling surface for cooling a moisture-carrying gas flow and for condensing water vapour. In contrast to prior art processes, the material is dried intermittently by means of a gas flow which is colder than the material and which is progressively heated by heat exchange when flowing through the material. During heating, the gas flow takes up an increasing amount of vapour which is expelled from the goods to the gas because of the vapour pressure difference between warmer material and colder gas. Also the requisite heating and evaporation heat is supplied intermittently to the material by means of a substantially greater gas flow which is warmer than the material. According to the invention, cycling between cooling/drying and reheating is effected between at least two preferably gastight chambers within which the total amount of the material to be dried is distributed in two substantially equal lots, the enthalpy flow from the cooling/drying in one chamber preferably being transferred by a refrigerating machine for reheating the other chamber, simultaneously as condensate is precipitated on the cooling surface of the refrigerating machine. In other words, an enthalpy quantity is moved back and forth between the chambers at a given frequency during cyclic heat storage in the lots of material to be dried.

If the process is combined with efficient cooling, for example by means of a refrigerating machine, thermodynamically highly efficient drying is accomplished at low drying temperatures. Drying may be effected at a temperature level and in a closed gas environment in which the nutrient value and taste of, for example, different crops are maintained remarkably well.

The process according to the invention makes it possible, at low investment cost, to combine long-term storage of a moist organic material at a quality-preserving temperature level and in gaseous environment with a progressive slow drying-out which is extended during the storage period.

Atmospheric moisture may also in itself be regarded as a material to be dried. Furthermore, the drying process is applicable to moisture control in moisture-producing environments, for example in greenhouses, the air volume being divided in a similar manner into at least two separate parts which have substantially the same size and which are alternately cooled/dried and reheated, respectively.

The invention will be described in more detail below, reference being had to the accompanying drawings.

FIG. 3 illustrates an embodiment comprising a storing/drying device.

FIGS. 4a-c illustrate, as a further embodiment, and in plan and sectional views, the moisture control in closed cultivation chambers, such as greenhouses.

Figure 1A:
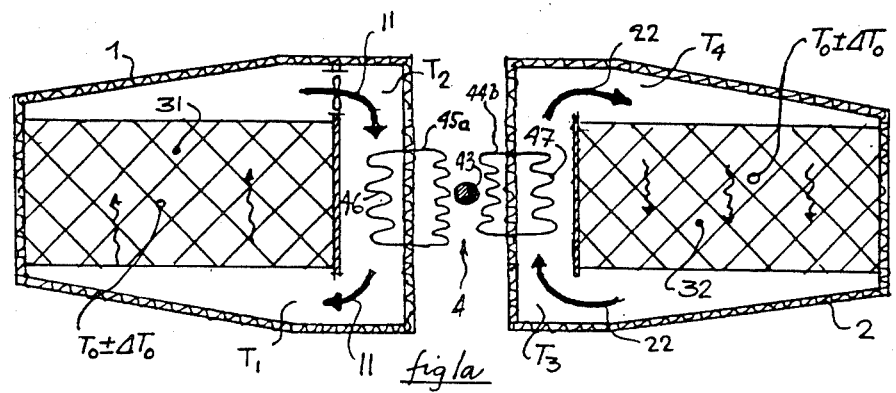
FIG. 1a illustrates a plant which is intended to be used with the process according to the invention and which comprises two chambers, one of which is cooled/dried and the other of which is heated.
Figure 1B:
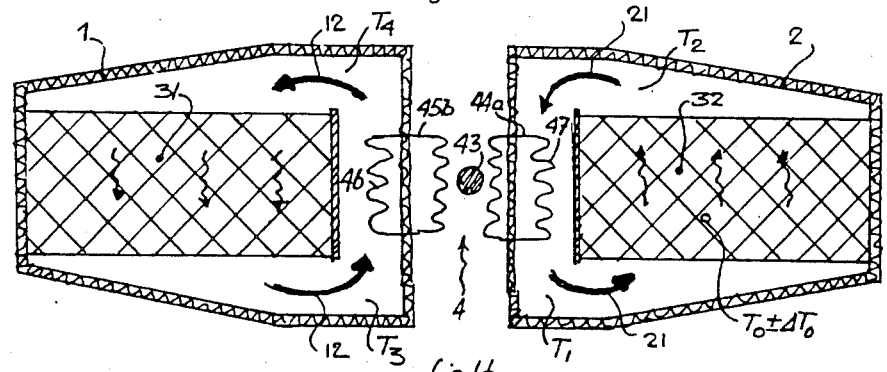
FIG. 1b shows the chambers according to FIG. 1a when subjected to the inverse treatment.

The material to be dried, which in the embodiment illustrated in FIGS. 1a and 1b is timber, is stacked in two equally large lots 31, 32, each in one gastight and preferably heat-insulated chamber 1 and 2, respectively. Stacking is carried out according to the type of the material to be dried and by methods which need not be explained in detail, to provide for fairly uniform distribution of a gas flow across the surface of the material.

In accordance with the invention, cooling/drying and heating are conducted alternately, in cycles of equal duration in each of the chambers 1 and 2. The chambers are operated inversely of one another, each undergoing cooling/drying while the other is undergoing heating. In chamber 1 a gas flow 11 is circulated alternately with a substantially larger gas flow 12 to effect cooling/drying and heating, respectively. In chamber 2 a gas flow 21 is circulated alternately with a substantially larger gas flow 22 to effect the respective cycles. In respect of enthalpy and time, the gas flow 11 is coupled with the gas flow 22, and the gas flow 12 is coupled with the gas flow 21 via a refrigerating machine-heat exchanger 4. The apparatus 4 comprises two circuits with the surfaces 46 and 47 each conducting a gas flow 11, 12 and 22, 21, respectively, and a working fluid 45a, 45b and 44a, 44b, respectively, serving either as a cooling medium or as a heating medium, depending upon whether the chambers 1, 2 are to be cooled/dried or heated. For example, if the chamber 1 is to be cooled/dried and the chamber 2 is to be heated, the surface 46 serves as a cooling surface and the surface 47 as a heating surface, a refrigerating machine 43 transferring enthalpy from the cooling surface 46 to the heating surface 47. When the chambers are subjected to the inverse treatment, the surface 46 naturally serves instead as a heating surface and the surface 47 as a cooling surface.

The mean temperature in the lots 31, 32 is designated $T_0$, and this temperature varies downwardly/upwardly during the cooling/heating cycles by a relatively small amount $\Delta T_0$. During a heating cycle, the enthalpy quantity $2(C_p \cdot \Delta T_0)$ (in which $C_p$ represents the specific heat capacity in kcal/kg.K) in a lot of material, and this enthalpy quantity is taken up during the subsequent cooling/drying cycle by a cooled gas flow, mainly in the form of vapour formation heat.

As will appear from FIGS. 1a and 1b, the cooled gas flows 11 and 21 are conducted in a direction opposite to that of the heated gas flows 12 and 22 in the chambers 1 and 2, respectively. As a result, drying will be fairly uniform across the entire drying bed, and the temperature differences between cooled and heated gas flows are minimized, which has a positive effect on the running economy of the refrigerating machine 43.

The entire cycle which comprises a cooling/drying cycle and a heating cycle, will now be described in more detail with reference to FIGS. 1a and 1b. As will appear from FIG. 1a, a gas flow 11 is cooled to a temperature $T_1$ which is about 10°–15° C. lower than the temperature $T_0$ of the lot 31. While passing through this lot, the gas stream 11 is progressively heated and takes up water vapour which is expelled from the material because of the vapour pressure difference. Since the gas flow is small and the heat dissipating surface of the material to be dried is large, the gas flow 11 leaves the lot 31 at a temperature $T_2 \approx T_0$ with a high vapour content, and is then cooled to $T_1$ and dehumidified in the refrigerating machine-heat exchanger 4 which transfers the enthalpy flow to the lot 32 in the chamber 2 via a gas 22 circulating through this chamber and operating with a temperature difference $(T_4-T_3)$, $T_3 \approx T_0$. The enthalpy transport of the moisture-carrying enthalpy-rich gas flow 11 is meant to balance the enthalpy transport of the enthalpy-poor gas flow 22 which transports no moisture and which therefore has a considerably larger volumetric flow.

As will be appreciated from the above, the steam formation heat for expelling moisture from the lot 31 has been taken from the material itself. This loss of enthalpy is replaced during the second half of the cycle, during which the roles are reversed and the lot 32 is cooled/dried with a gas flow 21, and the lot 31 is reheated by means of a larger, heated gas flow 12. Any non-uniform drying during the drying process is corrected for during the heating, and the moisture content in the material is balanced.

Figure 2A:
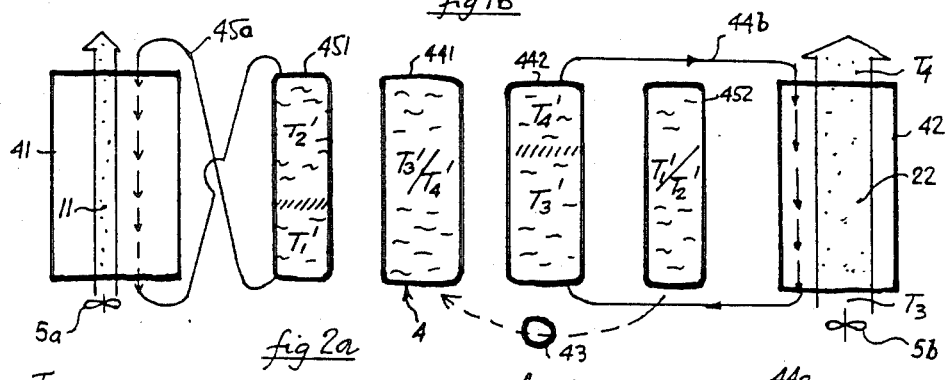
FIGS. 2a and 2b illustrate a cooling/heating device comprised by the plant.
Figure 2B:
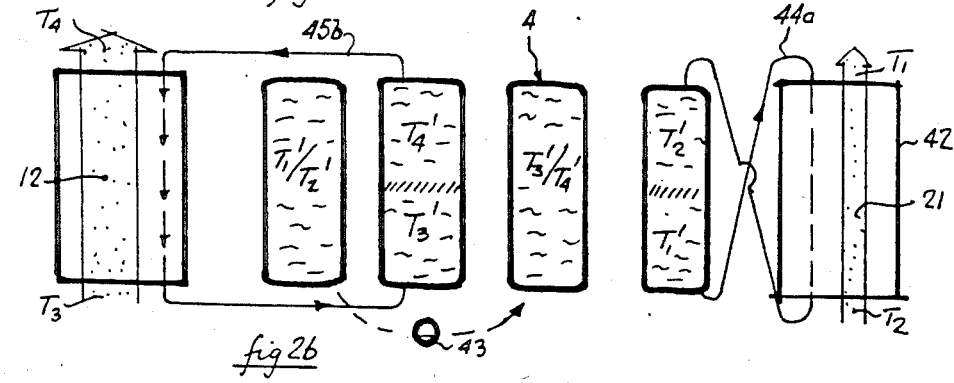

FIGS. 2a and 2b illustrate schematically an embodiment of the refrigerating machine-heat exchanger 4. A gas/liquid heat exchanger 41 having a surface 46 (FIGS. 1a, 1b) is connected in series with the chamber 1 and provided with a two-stage fan 5a for either a smaller volumetric flow 11 or a larger volumetric flow 12. An identical heat exchanger 42 having a surface 47 (FIGS. 1a, 1b) is connected in series with the chamber 2 and provided with a two-stage fan 5b for a smaller fluid 21 and a larger flow 22, respectively. Cooling-/heating of said gas flows is effected by means of a heated liquid flow 45b, 44b and a cooled liquid flow 45a, 44a which are connected alternately via controlled magnetic valves from a refrigerating machine 43 ror liquid/liquid heat exchange. This machine preferably is designed in accordance with Swedish patent application No. 8306037-6. The refrigerating machine 43 comprises, in this embodiment, a compressor-operated water cooler in combination with two hot water tanks 441, 442 and two cooling water tanks 451, 452.

It appears from FIG. 2a which shows one half of the cycle, that the pair of tanks 441/452 are charged separately, while the tank 451 takes up heat in the operating range $T_2'/T_1'$ from the gas flow 11, while the tank 442 gives off heat to the larger gas flow 22 in the operating range $T_4'/T_3'$.

FIG. 2b which shows the other half of the cycle, illustrates how said pair of tanks 451/442 are charged by means of the refrigerating machine 43, while the tank 441 heats the larger gas flow 12, and the tank 452 cools the smaller gas flow 21.

The calculation below shows that an excellent total running economy is obtainable if an efficient heat exchanger with low thermal resistance is used.

FIG. 3 illustrates an embodiment in which the material to be dried is grain stored in two heat-insulated chambers 1 and 2 in equal lots of 1,000 tons each, said chambers being equipped in a known manner with Λ-shaped venting ducts 6. Since grain which is still moist from harvest may be stored at $+10°$ C. without deteriorating, the grain thus has been stored at $T_0 = +10°$ C., and is dried for 6 months or about 4,000 hours. This means that, when drying is to be carried out from a moisture content of 19% to a moisture content of 14%, 80 tons of water must be evaporated from each chamber, and this means in total that 40 kg of water must be evaporated per hour. When $T_2 = T_0 = +10°$ C. and $T_1 = 0°$ C., 4 g/kg of gas flow 11 are carried away, the requisite cooling/drying flow $= 40,000/4 = 10,000$ kg/h, and the requisite cooling effect $= 10 \times 10,000 \times 0.24 + 40 \times 600 = 48,000$ kcal./h. If $\Delta T = T_4 - T_0 = 4°$ C. for the gas flow 22, the enthalpy flow will be $4 \times 0.24 = 1$ kcal/kg, and the corresponding volumetric flow will then be $48,000/1 = 48,000$ kg/h. Since these air flows are small compared to the storage volume within the chambers, the static counterpressure will be low.

With an efficient heat exchanger, for example a thin-film heat exchanger as disclosed by SE patent application No. 8008235-7, there is no difficulty in maintaining a temperature difference of 3°. In this manner there is obtained:

$T_1' = -3°$ C.
$T_2' = +7°$ C.
$T_3' = +13°$ C.
$T_4' = +17°$ C.

The cooling unit is operating with the mean values of the these temperatures, i.e.

$+2°$ C./$+15°$ C. Evaporation/condensation $= -2°$ C./$+20°$ C.

Cooling factor Carnot $= 271/22 = 12$

Cooling factor eff. $= 0.5 \times 12 = 6$

Total energy requirement cooling unit $=$ $$\frac{48,000 \times 4,000}{6 \times 860} = 38,000 \text{ kwh}$$

Total energy requirement fans $= 5 \times 4,000 = \frac{20,000 \text{ kwh}}{58,000 \text{ kwh}}$ Energy requirement drying $= 58,000/2,000 = 29$ kwh/ton This value should be compared with the energy requirement during hot air drying $\approx 100$ kwh/ton. Moreover, a conventional hot air drier must be dimensioned for a very short, energy-intensive harvesting season, and the capital expenditure for such drying will therefore be high. The drying process according to the present invention makes it possible to extend the drying time by a factor 10, and capital expenditure will therefore be reduced correspondingly.

The closed drying system is supplied with energy via fans and cooling compressors, and positive or negative heat exchange with the ambient atmosphere is carried out. In order to maintain a specific storage temperature, $+10°$ C. in the embodiment illustrated, it may be necessary to divert excess heat to the ambient atmosphere, which is done by means of an external cooling circuit 7 consisting of, for example, an evaporator/water shower heat-exchanged by means of a cooling surface 71 towards the internal circulation system of the drying process, preferably towards the cooled gas flows 11, 21, said cooling surface 71 contributing to the condensation of the water vapour.

The above-mentioned diversion of excess heat is utilized also for cooling freshly harvested grain to storage temperature. The cooling capacity of the cooling unit, which is 48,000 kcal/h, makes it possible to cool 75 tons/h from $+20°$ C. to $+10°$ C. The entire storage volume of 2,000 tons may thus be cooled in about 12 days, which well fits in with the harvesting season.

The above-mentioned example shows that drying according to the process of the present invention may be carried out with a high thermodynamic efficiency also at low temperatures. When drying is effected at higher temperatures, the enthalpy quantity in the water vapour is increased to a high degree in relation to the enthalpy quantity in the corresponding transport gas, simultaneously as the relative fan work is reduced considerably. Both factors increase the drying yield.

The gas flows 11, 12, 21, 22 are conducted in circuits which are gastight to the ambient atmosphere. The gas may be air, but preferably is a gas or a gaseous mixture which effectively checks the growth of noxious fungus or germ cultures. For example, the gaseous mixture may be highly deficient in oxygen or have a suitable content of a toxic gas, such as carbon dioxide or ozone.

In the example referred to above, the cooling process comprises a cooling surface which has freezing temperature and thus is in need of defrosting. However, the heat exchange arrangement described above and comprising cyclic heating/cooling of the heat exchanging surfaces 46, 47 makes it possible to provide for cyclic defrosting.

The cycling frequency is adapted generally to the drying rate and the specific heat capacity $C_p$ of the material to be dried, such that the temperature variations $\pm \Delta T_0$ in the material are rather small, more particularly in the order of one or a few degrees. In the example described above, which comprises the combination low drying rate/high specific heat capacity, the cycling frequency, if $\Delta T_0 = 0.5°$ C., will be $\simeq 1$ drying cycle/day. In other examples comprising high drying rate/low specific heat capacity, the cycling frequency may be in the order of a few minutes. During drying, the heat capacity of the material to be dried is reduced progressively because of the water disposal. If the drying rate is unchanged, the cycling frequency will be increased concurrently with the drying rate.

FIGS. 4a-c illustrate an alternative embodiment of the refrigerating machine-heat exchanger unit 4, and in this case the air-drying process has been applied to a closed greenhouse environment. In this embodiment, the chambers 1, 2 are coupled alternately with the heat exchangers 41, 42 by means of adjustable dampers. In this embodiment, the chambers 1, 2 are two separate equally large greenhouse chambers separated by a common partition 81. In this application of the invention, the material to be dried is in the form of enclosed air masses 91, 92 and plant masses 101, 102. A vertical air cooling exchanger 41 having a surface 46, and a vertical hot air exchanger 42 having a surface 47 are incorporated in the partition 81. Adjustable lower and upper dampers 461, 471 and 462, 472, respectively, serve to circulate either the air mass 91 or the air mass 92 through either exchanger.

The cooling air exchanger 41 is dimensioned for cooling an air flow by about 10° C. and opens over a permeable transparent ceiling film 82. The hot air exchanger 42 is dimensioned for heating an air stream which is about 5 times larger by about 5° C. and opens beneath the ceiling film 82, for example by means of an air-distributing perforated tubular sheeting. Furthermore, a cooling medium flow 45 is conducted through the air cooling exchanger 41, while a heating medium flow 44 is conducted through the hot air exchanger 42, and a refrigerating machine 43 transfers enthalpy from the cooling medium flow 45 to the heating medium flow 44. The ceiling film 82 divides the chambers 1, 2 into upper zones 1b, 2b and lower zones 1a, 2a, between which but an insignificant spontaneous mixing of air occurs.

A drying cycle thus is carried out in the following manner. An initially heated and vapour-rich air mass 91 is circulated during one half of the cycle via a flow 11 during cooling and dewatering in the cooling exchanger 41, via the upper zone 1b and distributed via perforations in the ceiling film 82 back to the chamber zone 1a. The temperature of the air mass 91 is reduced progressively so that also the temperature of the plant mass 101 is decreased, but with a certain time lag. A positive vapour pressure differential continuously expels water vapour from the plant to the air which attains near saturation. During cooling, the cooling exchanger 41 thus will operate with a gas flow 11 having a high vapour content. The enthalpy flow from the cooling exchanger 41 is transferred to the heat exchanger 42, and the air mass 92 is circulated therethrough and through the lower zone 2a in the form of an air flow 22. The initially cooled air mass 42 is progressively heated while taking up an increasing amount of vapour from the plant mass 102 which, simultaneously with the air circulation, is supplied with fresh vapour formation heat.

During the second half of the drying cycle, the roles are reversed by reversal of all dampers, such that the material 91, 101 in the chamber 1 is reheated by circulation of the air mass 91 in a flow 12 through the heat exchanger 42, while the material 92, 102 in the chamber 2 is cooled/dried by circulation of the air mass 92 in a flow 21 through the cooling exchanger 41.

An additional effect of this distribution of the cooled air flows 11, 21 in the upper distribution zones 1b, 2b is that the heat exchange of the chambers 1, 2 with the colder ambient atmosphere, via the ceiling surfaces of said chambers, is reduced.

The mode of operation of the refrigerating machine-heat exchanger unit 4 in this last-mentioned embodiment distinguishes from the embodiment previously described in connection with FIG. 2 in that the cooled gas flows 11, 21 are periodically alternately conducted, by means of dampers or a valve arrangement, across a continuously operating cooling surface 46, and that the heated gas flows 22, 12 are conducted, in a corresponding manner, periodically and alternately across a continuously operating heating surface 47. In actual practice, this mode of operation may be preferred for drying at such temperature levels where the cooling surface need not be defrosted, and in drying processes having a high cycling frequency.

As will appear from the above description, the drying process according to the present invention has a broad range of application, both in respect of the type of the material to be dried and the type of drying environment.

Top quality drying is accomplished in that damage due to fungus or germ growth can be avoided by suitable selection of the gaseous environment, and damage in the form of desiccation cracks can be avoided in that, with this drying technique, the material is dried in a direction from its interior to its outer side. The above-mentioned enthalpy transfer between cooled and heated gas flows by means of a refrigerating machine furthermore provides for a high degree of energy efficiency.

If the improvements in quality discussed earlier are desired in a particular case where high energy efficiency may not be so important, it is possible within the scope of the present invention to effect cooling of the first and fourth gas flows 11, 21 at the cooling surface 46 by means of an external cooling medium, for example a cooling water flow, and correspondingly heating of the second and third gas flows 12, 22 may take place at the heating surface 47 by means of an external heating medium, such as a hot water flow.

I claim:

1. A closed intermittent drying process for drying moist material, comprising storing a first lot of the moist material in a first substantially gastight chamber; storing a second and substantially equal-size lot of the moist material in a second gastight chamber; alternately circulating a first gas flow and a second gas flow within the first chamber, the first gas flow being cooled and passed through the first lot in such a manner as to effect cooling and drying of the material of the first lot, the second gas flow being heated and passed through the first lot in such a manner as to effect heating of the material of the first lot while transporting substantially no moisture from that material; alternately circulating a third gas flow and a fourth gas flow within the second chamber, the third gas flow being heated and passed through the second lot in such a manner as to effect heating of the material of the second lot while transporting substantially no moisture from that material, the fourth gas flow being cooled and passed through the second lot in such a manner as to effect cooling and drying of the material of the second lot, the first and third gas flows being circulated concurrently and the second and fourth gas flows being circulated concurrently; and transferring enthalpy from the first gas flow to the third gas flow and from the fourth gas flow to the second gas flow.

2. A process as claimed in claim 1, characterized in that the second and third gas flows are volumetrically substantially larger than the first and fourth gas flows.

3. A process as claimed in claim 1, characterized in that the first gas flow is conducted in a direction opposite to that of the second gas flow through the first lot and that the third gas flow is conducted in a direction opposite to that of the fourth gas flow through the second lot.

4. A process as claimed in claim 1, characterized in that all of the aforesaid gas flows have a growth-inhibiting effect on at least one of fungus and germ cultures.

5. A process as claimed in claim 1, characterized in that each lot of material is alternately cooled-dried and heated at a cycling frequency determined according to the drying rate and specific heat capacity of that lot such that the mean temperature of the material of that lot varies on the order of a few degrees.

6. A process as claimed in claim 5, characterized in that the cycling frequency is increased as drying progresses and reduces the specific heat capacity of the material in each lot.

7. A process as claimed in claim 1, characterized in that excess heat generated by the process is diverted to the ambient atmosphere by heat exchanging means which draws heat from the first and fourth gas flows.

8. A process as claimed in claim 1, characterized in that enthalpy from the first and fourth gas flows is transferred to the second and third gas flows, respectively, by means of a refrigerating machine-heat exchanger unit which has heat exchange surfaces which cool the first and fourth gas flows and heat the second and third gas flows.

9. A process as claimed in claim 8, characterized in that the refrigerating machine-heat exchanger unit transfers enthalpy between a first gas heat exchanger connected in series in the first chamber with the first and second gas flows and a second gas heat exchanger connected in series in the second chamber with the third and fourth gas flows, by alternately conducting a cooling medium flow and a heating medium flow through each of the gas heat exchangers.

10. A process as claimed in claim 8, characterized in that the refrigerating machine-heat exchanger unit has a first gas heat exchanger through which a cooling medium is constantly conducted and which is connected alternately in series with each of the first and fourth gas flows by flow control means, and a second gas heat exchanger through which a heating medium is constantly conducted and which is connected alternately in series with each of the second and third gas flows by the flow control means.

11. A closed intermittent drying process for drying moist material within a substantially gastight chamber, characterized in that the material is intermittently dried by means of a first gas flow circulated in a closed path in which the first gas flow is cooled and dehumidified and conducted through the moist material such that the necessary vapor dissipation heat for drying is taken from the latent heat of the moist material, and latent heat is restored to the moist material alternately with said drying by means of a second gas flow circulated in a closed path in which the second gas flow is heated and conducted through the moist material in such a manner that the moist material is heated but substantially no water vapor is transported from the material.

12. A process as claimed in claim 11, characterized in that the second gas flow is volumetrically substantially larger than the first gas flow.

13. A process as claimed in claim 11, characterized in that the second gas flow is conducted through the moist material in a direction opposite to that of the first gas flow.

14. A process as claimed in claim 11, characterized in that the first and second gas flows are cooled and heated, respectively, by a heat exchanger to which a cooling medium flows during drying of the moist material and to which a heating medium flows during the restoration of latent heat to the moist material.

* * * * *